A. T. BROWN.
GEARING.
APPLICATION FILED JAN. 6, 1910.

1,227,242.

Patented May 22, 1917.
3 SHEETS—SHEET 3.

*Fig. 3*

WITNESSES:
Chas. H. Young.
Emma N. Sumiller.

INVENTOR.
Alexander T. Brown
BY
Parsons Hall Prodell
ATTORNEYS.

UNITED STATES PATENT OFFICE.

ALEXANDER T. BROWN, OF SYRACUSE, NEW YORK, ASSIGNOR TO BROWN-LIPE GEAR COMPANY, OF SYRACUSE, NEW YORK, A CORPORATION OF NEW YORK.

GEARING.

1,227,242.   Specification of Letters Patent.   Patented May 22, 1917.

Application filed January 6, 1910. Serial No. 536,602.

*To all whom it may concern:*

Be it known that I, ALEXANDER T. BROWN, of Syracuse, in the county of Onondaga and State of New York, have invented a certain new and useful Gearing, of which the following is a specification.

My invention has for its object a changeable speed gearing which is particularly simple, efficient and durable; and it consists in the combinations and structures hereinafter set forth and claimed.

In describing this invention, reference is had to the accompanying drawings in which like characters designate corresponding parts in all the views.

Fig. 3 is an end elevation, partly in section, of my gearing.

Figure 1:
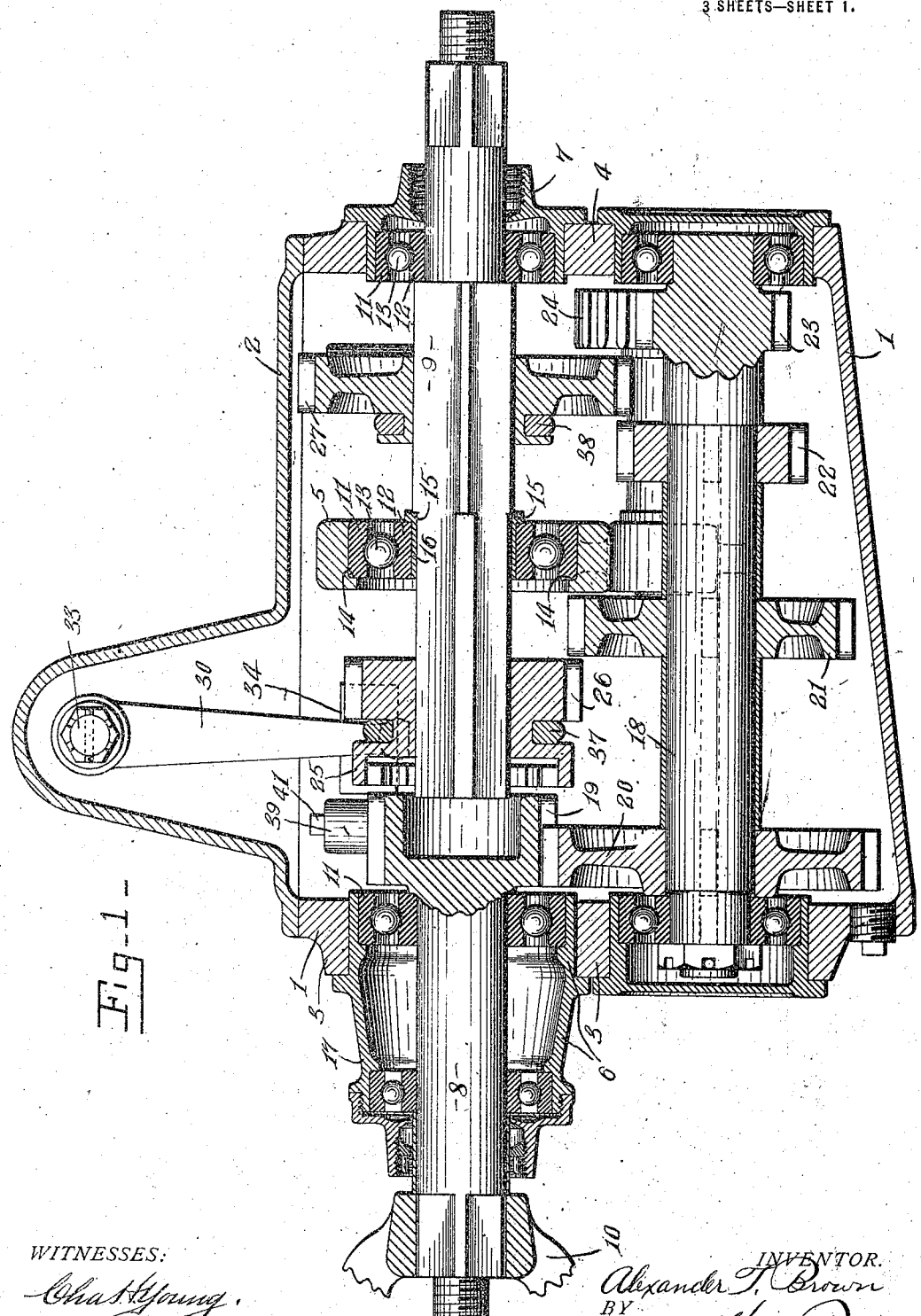
Figure 1 is a vertical section, partly in elevation, of my gearing.

1 is the case or supporting frame provided with a removable cover or part 2 and with means for supporting three bearings in axial alinement. Preferably, the case is formed with integral opposing walls 3, 4 having axially alined openings therein, and with an integral support 5 located intermediate of the walls 3, 4, the openings in the walls 3, 4 being closed by caps 6, 7 supporting axially alined antifriction bearings, and the support 5 being provided with a transverse opening containing an antifriction bearing axially alined with the former bearings.

8 is a shaft journaled in the outer bearing supported by the end wall 3 and projecting toward the intermediate bearing carried by the support 5, and 9 is a shaft journaled in the outer bearing supported by the end wall 4 and in said intermediate bearing carried by the support 5, and projecting beyond the support 5 and meeting the shaft 8 between the end wall 3 and said support. Usually, the shaft 9 is driven and the shaft 8 serves as a driver being connected to a motor by a power-transmitting coupling 10, but this order may be reversed.

The antifriction bearings carried by the end walls 3, 4 and the support 5 may be of any desirable form, size and construction, but as here illustrated, comprise outer rings 11 secured to the caps 6, 7 and the inner face of the transverse opening in the support 5, inner rings 12 mounted on the shafts 8, 9, and antifriction members or balls 13 between the rings 11 and 12. Preferably, one end face of the outer ring 11 of the intermediate antifriction bearing engages an internal annular shoulder 14 provided in the bearing receiving opening of the support 5, and the opposite face of the inner ring of said bearing coacts with an annular shoulder 15 formed on the shaft 9. As in the illustrated exemplification of my invention, the portion of the shaft 9 within the inner ring 12 is non-circular, a collar 16 is fitted on said shaft within the inner ring 12, the collar having an annular flange which extends between said ring 12 and the shoulder 15. The outer antifriction bearings may be held in position by similar shoulders provided on the contiguous surfaces of the caps 6, 7 and the shafts 8, 9. As here illustrated, the cap 6 is provided with an outward extension 17 which supports an additional anti-friction bearing for the shaft 8, such bearing being similar in construction to the former bearings. It will be understood, however, that this additional bearing for the shaft 8 may be dispensed with, if desired.

As here illustrated the connections between the shafts 8 and 9 comprise a shaft 18 extending parallel to the shafts 8 and 9 and journaled at its ends in bearings carried by the end walls 3 and 4 of the case; a gear 19 revoluble with the shaft 8 and normally located near the bearing of the wall 3 for supporting said shaft, the inner portion of the gear 19 constituting a clutch member; a gear 20 fixed on the shaft 18 and permanently meshing with the gear 19, the gear 20 being located near the plane of the bearing of the wall 3 for supporting the shaft 8; gears 21 and 22 fixed to the shaft 18 and arranged at opposite sides of the bearing support 5; a gear 23 fixed to the shaft 18 and located near the plane of the bearing of the wall 4 for supporting the shaft 9; a gear 24 constantly meshing with the gear 23; an internal clutch member 25 arranged between the wall 3 and the bearing support 5 upon the end of the shaft 9 projecting beyond the support, said clutch member being revoluble with the shaft 9 and movable axially relatively thereto into and out of engagement with the clutch member formed by the inner portion of the gear 19; a gear 26 fixed to the clutch member 25 and forming therewith a single shiftable element, the gear 26 being movable toward and from the intermediate bearing carried by the bearing support into and out of engagement with the gear 21; and a gear 27 arranged between the wall 4 and the bearing support 5 and mounted upon and revoluble with the shaft 9, the gear 27 constituting a second shiftable element and being movable into and out of engagement with the gears 22 and 24. To facilitate the axial movement of the clutch member 25 and the gears 26 and 27, the shaft 9 and the shaft-receiving openings in said clutch member and gears are formed angular in cross section.

The intermediate bearing for supporting the driven shaft 9 and the shiftable actuating elements for such shaft arranged on opposite sides of the intermediate bearing and its support provide a particularly strong and durable structure which greatly augments the life and efficiency of my gearing. It will be understood, however, that although the described connections between the shafts 8 and 9 are particularly desirable and suitable for use with the intermediate bearing of my gearing and the shiftable elements on opposite sides of the plane of such bearing, other means may be used for connecting the shaft 8 to the shiftable elements of this gearing and one or both of said shiftable elements may be mounted upon the shaft 18 instead of the shaft 9.

The axial movement of the clutch member 25 and the gears 26 and 27 is preferably effected by shifters 28, 29, and suitable means, as a rock arm 30, which coacts at its free end with sockets 31, 32 in opposing faces of the shifters and is carried by an axially movable rock shaft 33 and is moved by said rock shaft lengthwise of the axis thereof to engage the predetermined shifter and is then moved about such axis for actuating the shifter, this arm 30 being guided in its movement by a bearing plate 34 fixed to the case 1. The means for actuating the shifters forms no part of my present invention, and hence further description thereof is deemed unnecessary.

Figure 2:
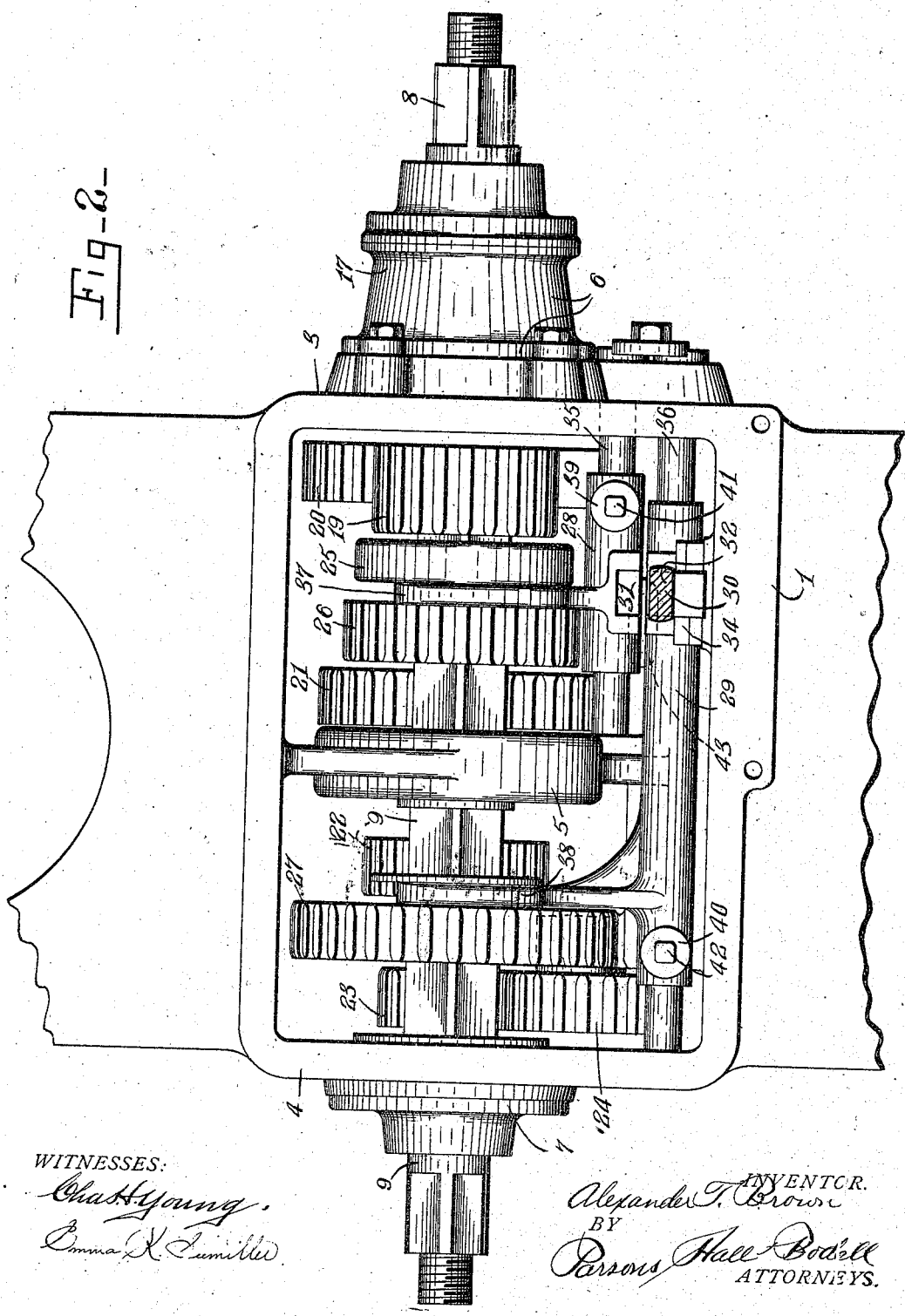
Fig. 2 is a plan, partly in section, of parts seen in Fig. 1, the cover being removed.

The shifter 28 is mounted on a fixed guide rod 35 having its opposite ends supported by the wall 3 and the intermediate bearing support 5, and the shifter 29 is mounted on a fixed guide rod 36 having its ends supported by the opposing walls 3, 4. Said shifters are provided with forks 37, 38 for engaging the shiftable elements on the shaft 9 and are also provided with barrels 39, 40 for containing spring pressed pawls 41, 42 having their lower ends engaged with recesses formed in the contiguous surfaces of the guide rods 35, 36. When one of the shifters is being actuated, the other is held in its neutral position by any suitable locking member 43, Figs. 2 and 3, which forms no part of my present invention. By carrying one end of the guide rod 35 in the bearing support 5, this rod is shorter than would otherwise be possible, there is no necessity for crooking or deflecting a part of the fork of the shifter 29 to avoid contact with said rod, and a larger gear 27 may be used than would otherwise be possible.

What I claim is:—

In a change speed gearing and in combination, a casing having alined bearings in opposing walls thereof, an intermediate bearing between the former bearings and alined therewith, driving and driven shafts, one of said shafts being journaled in the bearing in one of said opposing walls, and the other of said shafts being journaled in the bearing in the other of said opposing walls and in the intermediate bearing and projecting beyond the intermediate bearing toward the former shaft, the opposing ends of the shafts being unsupported by each other, the casing being also formed with additional alined bearings in said opposing walls thereof, a countershaft journaled in the additional bearings, gears mounted on the shafts, some of the gears being fixed and the others being slidable, some of the fixed gears being located near the bearings of the casing and others of said fixed gears being located near and on opposite sides of the intermediate bearing, and the shiftable gears being located on opposite sides of the intermediate bearing, substantially as and for the purpose described.

In testimony whereof, I have hereunto signed my name in the presence of two attesting witnesses, at Syracuse, in the county of Onondaga, in the State of New York, this 28th day of December, 1909.

ALEXANDER T. BROWN.

Witnesses:
S. DAVIS,
E. K. SUMILLER.